(12) United States Patent
Bucher et al.

(10) Patent No.: US 6,597,464 B2
(45) Date of Patent: Jul. 22, 2003

(54) METHOD AND DEVICE FOR TESTING A CUTTING-EDGE GEOMETRY OF A ROTATABLY DRIVABLE TOOL

(75) Inventors: Heribert Bucher, Tettnang (DE); Bruno Riedter, Weingarten (DE)

(73) Assignee: Blum-Novotest GmbH, Grunkraut (DE)

( * ) Notice: Subject to any disclaimer, the term of this patent is extended or adjusted under 35 U.S.C. 154(b) by 0 days.

(21) Appl. No.: 10/124,500

(22) Filed: Apr. 17, 2002

(65) Prior Publication Data

US 2002/0118372 A1 Aug. 29, 2002

Related U.S. Application Data

(63) Continuation of application No. PCT/EP00/10313, filed on Oct. 19, 2000.

(30) Foreign Application Priority Data

Oct. 19, 1999 (DE) .......................... 199 50 331

(51) Int. Cl.⁷ .............................. G01B 11/10
(52) U.S. Cl. ..................... 356/638; 356/613
(58) Field of Search ................. 356/638, 613

(56) References Cited

U.S. PATENT DOCUMENTS 3,817,647 A  6/1974  Lemelson
3,900,738 A * 8/1975  McKay, Sr. ............ 250/559.14
4,667,113 A  5/1987  Nakajima et al.
5,005,978 A * 4/1991  Skunes et al. ............. 356/625

FOREIGN PATENT DOCUMENTS

| | | |
|---|---|---|
| DD | 245481 A1 | 5/1987 |
| DE | 3218754 C2 | 11/1983 |
| DE | 3905949 A1 | 8/1990 |
| DE | 4238504 A1 | 5/1994 |
| DE | 4244869 C2 | 5/1994 |
| DE | 69223544 T2 | 12/1997 |
| DE | 19720176 C1 | 2/1999 |
| JP | 02212045 | 8/1990 |

\* cited by examiner

*Primary Examiner*—Richard A. Rosenberger
(74) *Attorney, Agent, or Firm*—Clifford W. Browning; Woodard, Emhardt, Moriarty, McNett & Henry LLP

(57) ABSTRACT

The testing of a cutting-edge geometry of a tool takes place during time intervals that comprise time instants at which it is to be expected that a region, to be tested, of the tool enters a measuring beam. At time instants at which the tool does not enter the measuring beam, no measurements are performed, which increases the reliability of the test and avoids spurious measurements. For this purpose, a measuring system is used that preferably comprises programmable units in order to use the invention flexibly for various machine tools and tools without changing the construction of the measuring system.

45 Claims, 6 Drawing Sheets

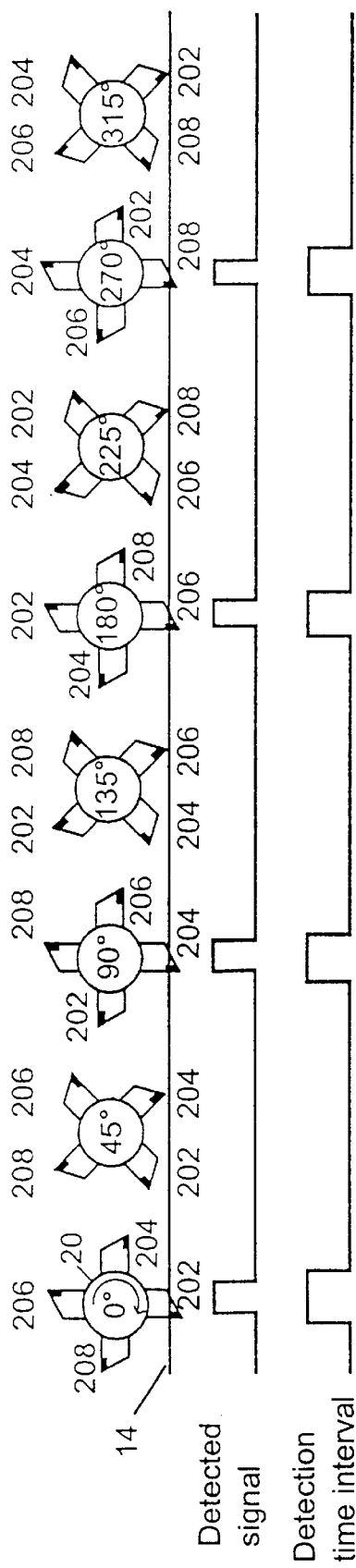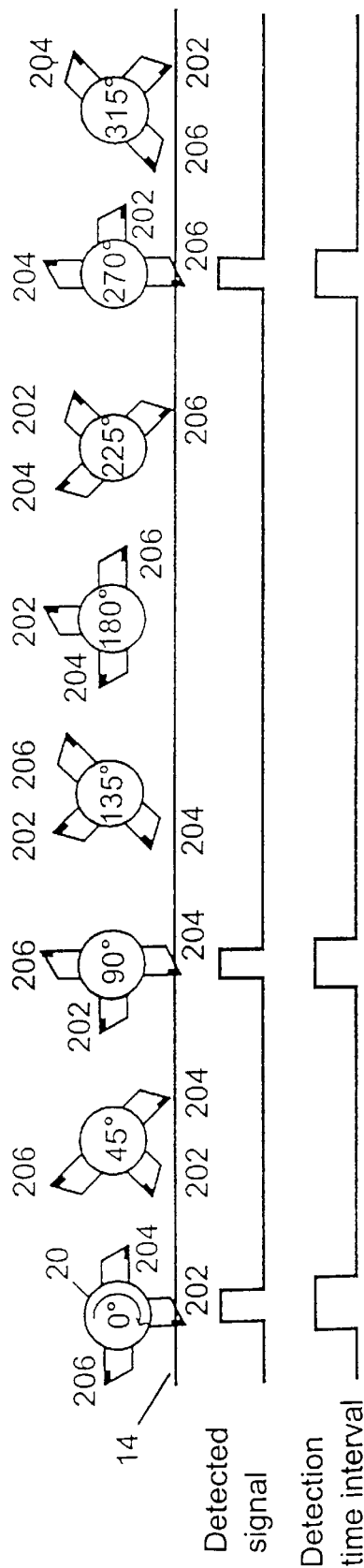

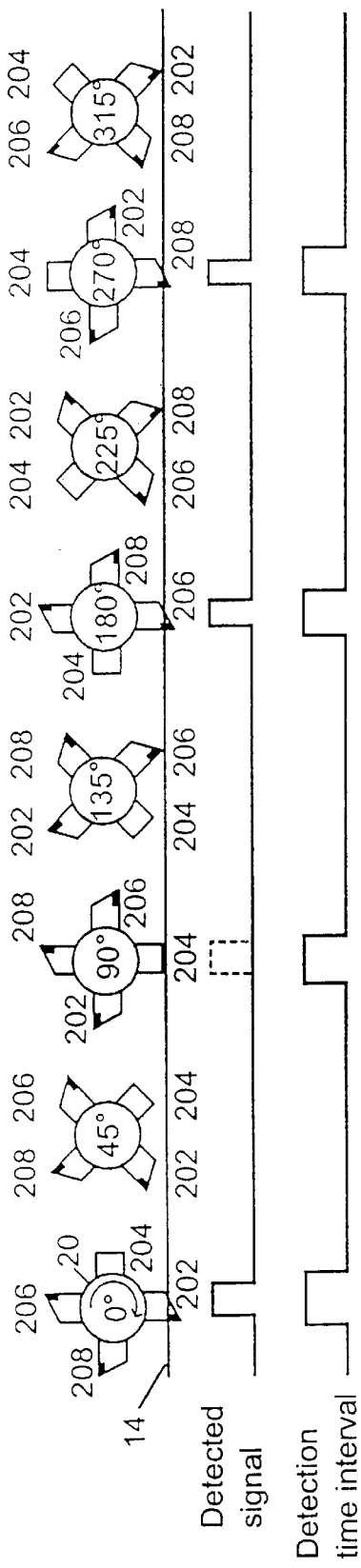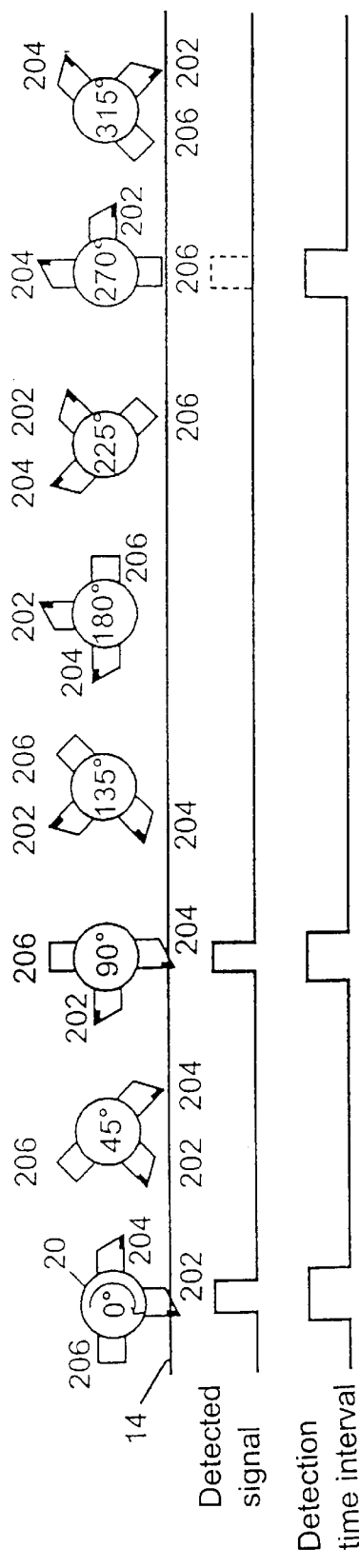

Figure 1:
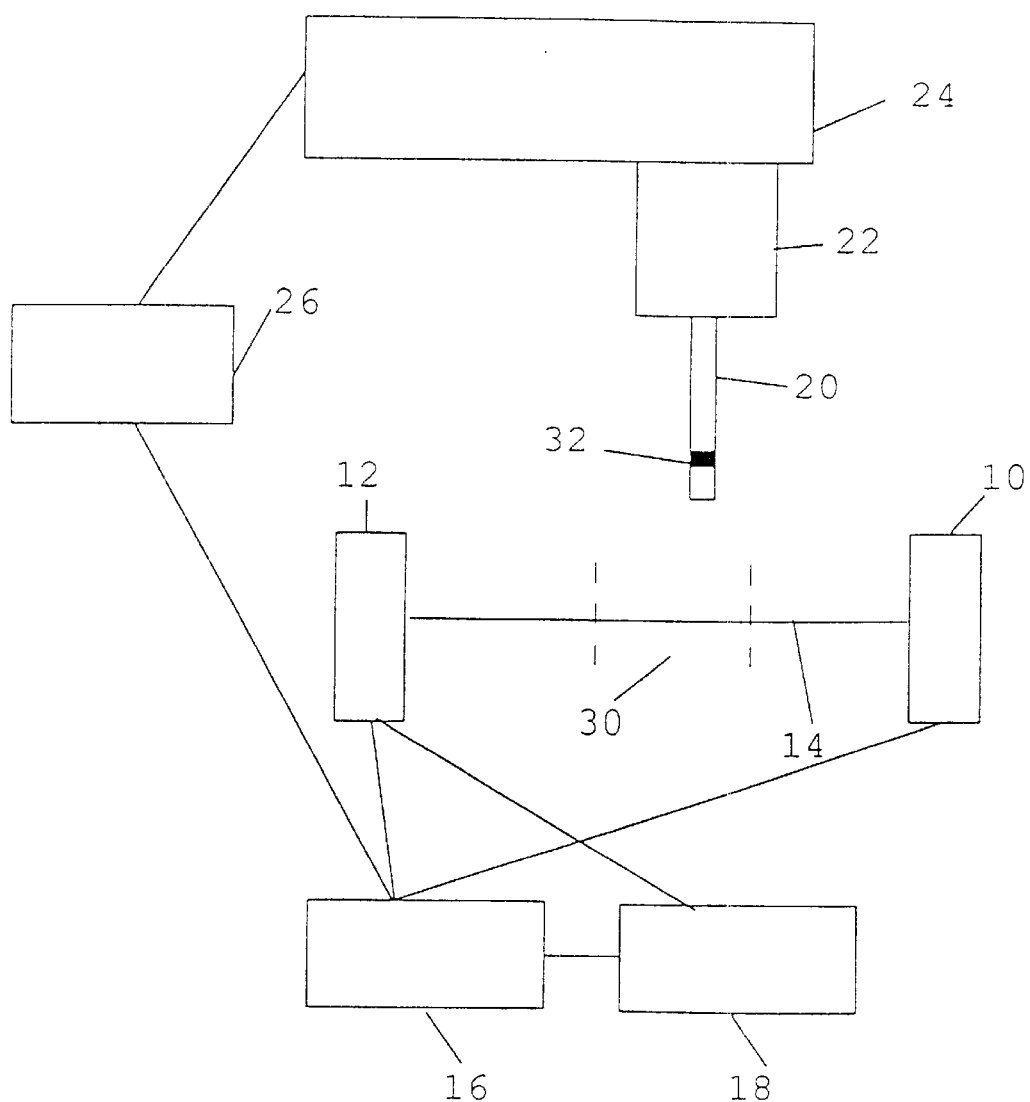

METHOD AND DEVICE FOR TESTING A CUTTING-EDGE GEOMETRY OF A ROTATABLY DRIVABLE TOOL

This is a continuation of Application No. PCT/EP00/10313, filed Oct. 19, 2000.

The invention relates to a method for testing a cutting-edge geometry of a rotatably drivable tool and a device for performing the method according to the invention. In particular, the invention relates to the testing of a cutting-edge geometry of a tool for the purpose of breakage and wear monitoring by means of a measuring beam.

The use of measuring systems to test rotatably drivable tools using a measuring beam, in particular an optical measuring beam is known. Thus, DE 42 38 504 describes a method that measures the length and the diameter of a tool and also concentricity errors using a thin laser beam. In this way, not only can the setting of the tool be checked, but also wear or a break in the tool can be detected. In this procedure, the tool is presented to an optical measuring plane perpendicular to the measuring plane. The measuring system outputs a signal that indicates whether the tool has entered the measuring plane. When the tool enters, its relative position is determined with respect to the measuring plane in order to calculate the dimensions of the tool using reference points. In order, in addition, to determine the concentricity and the diameter of the tool, the rotating tool is also fed parallel to the measuring plane.

In order to avoid impairments of the measuring operation as a result of contaminants in the air in a measuring region of an optical measuring system, in accordance with DE 42 44 869, a signal that indicates the entry of a tool into the measuring plane is generated only if a drastic signal decrease is detected in a laser beam used as measuring beam. In addition, comparison values are recorded by the measuring system that serve as reference values for individual measuring operations and are intended to reduce interference effects that impair the measuring operation.

Furthermore, DE 32 18 754 discloses a method for measuring the length of a rotatably drivable tool. In this method, the tool passes an optical measuring device, the position of the tool being determined when the tool tip passes through a measuring plane of the optical measuring device. The length of the tool can be calculated by comparing the measured position with a standard position of the tool. In this way, it is also possible to determine whether the tool is broken.

During the industrial application of these described methods, it has emerged that faulty or unsatisfactory measurements occur as a result of contaminants, e.g. due to coolants or metal chips, in the measuring regions of the optical measuring systems used. Furthermore, the optical measuring systems used have to be re-adjusted as a function of the tools used and also their rotational speed has to be re-adjusted for the particular application case. In addition, none of these known methods makes possible a check of the individual cutting edges of a tool or also a complete check of the geometry of a tool.

DE 39 05 949 A1 discloses a measuring system for testing a cutting-edge geometry in which occlusions of a measuring beam due to obstacles in its propagation path are detected and evaluated. No provision is made therein to take account of standard time instants and detection time instants.

In accordance with DE 692 23 544 T2, interferences in the optical measurement of the profile of an object are eliminated in that the optical scanning of the object by means of a laser beam is restricted to predetermined time intervals. For this purpose, the laser beam is allowed to emit light in an illumination time interval, whereas the laser beam is switched off in a switched-off time interval. For this purpose, a read-out device for receiving the laser beam is operated synchronously in order to repeat alternately a synchronous read-out scanning operation of light-receiving elements.

DD 245 481 A1 discloses a method and an arrangement for determining photoelectrically the position of edges on rotating specimens with respect to their axis of rotation. In this method, during a first revolution, that rotation position of the specimen relative to the photoreceiver in which a specified edge of the specimen is detected by a photoreceiver is determined by means of an optical measuring method. During further revolutions of the specimen, only those photoreceiver signals that are detected in the previously determined rotation position of the specimen are evaluated by means of a high-resolution, slow method.

From U.S. Pat. No. 3,900,738, U.S. Pat. No. 3,817,647, JP(A) 0 221 20 45 and U.S. Pat. No. 4,667,113, it is known, for the purpose of testing a cutting-edge geometry of a rotatably drivable tool, to move a region to be tested of a tool that is being rotated at a specified rotational speed into a measuring range defined by a measuring beam and to detect signals that indicate when and if the measuring beam is instant on the region to be tested or is interrupted by it.

In accordance with DE 197 20 176 C1, to eliminate interfering signals in the case of a light barrier, light pulses incident on a receiver of the light barrier are evaluated only during specified time intervals whose time period is matched to the length of the time intervals within which light pulse sequences are emitted by a transmitter of the light barrier.

It is therefore the object of the invention to eliminate interference effects in a measuring plane of a measuring system during the testing of a rotatably drivable tool.

In order to make possible a desired machining quality with a rotatably drivable tool, it is necessary to ensure that the tools used have certain properties. Said properties include, inter alia, the positioning of a tool in a suitable holding device of the tool machine and also the geometry of the tool itself. With the aid of the method according to the invention, it becomes possible to check a rotatably drivable tool in regard to its actual shape. For this purpose, a region to be tested is defined on the tool, for example the region of the cutting edge of the tool. The tool is rotated at a desired rotational speed and is introduced into a measuring range that is defined by a measuring beam. As a result of the rotation of the tool, the measuring beam is able to strike that region of the tool to be tested, but it is also possible that the measuring beam does not strike the region to be tested. Beside this interaction with the region to be tested, interactions between the measuring beam and other media or substances situated in the measuring range may also occur, for example with drops of coolant or metal chips. In order to test the tool, the interactions of the measuring beam with the region to be tested are detected. In this connection, it is necessary to avoid interactions between the measuring beam and the other substances or media that result in spurious measurements.

According to the invention this is avoided in that the detection takes place only during time intervals that comprise time instants at which it is to be expected that the region to be tested enters the measuring beam during the rotation. Such time instants are determined using a specified pitch, denoted below as standard pitch, of a reference tool corresponding to the tool to be tested. These time instants determined are denoted below as standard time instants. The detection is then performed during chosen detection intervals that each contain a standard time instant in order to check, on the basis of optical interactions that occur or do not occur, whether the tool has the standard pitch or is damaged.

In this connection, provision is made that the detection time intervals are chosen in such a way that they do not overlap in time. Furthermore, the detection time intervals can be chosen in such a way that they comprise the corresponding standard time instant symmetrically.

Tools that are used as reference tools for the tools to be tested comprise real tools whose dimensions comply with the desired dimensions for the tool to be tested, for example undamaged or new tools, but also so-called "virtual tools". Here "virtual tools" are not to be understood as the tools in the actual sense, but the formal description of the dimensions of the tool geometry. The formal description may take place, for example, through mathematical formulae and/or data. Since, as described later below, the invention may also comprise programmable components, the use is to be preferred of "virtual" reference tools in the form of data that are stored and processed, for example, in a computer-aided manner.

The size of the chosen detection time intervals is to be chosen as small as possible as a function of the particular application case in order to restrict the detection to a time range that starts as short a time as possible before the standard time instant and ends as short a time as possible thereafter. In this way, the reliability of the tool testing is increased. Preferably, the detection time intervals are chosen so small that they contain the appropriate standard time instant only with a slight time excess.

Preferably, the standard time instants and/or detection time intervals are determined as a function of the rotational speed of the tool. In addition, it is advantageous if the standard time instants and/or detection time intervals are determined taking into account the standard pitch.

In a preferred embodiment of the invention, the detection time instants that are necessary to synchronize the detection with the rotating tool to be tested are determined by determining a standard time interval as a function of the standard pitch. Said standard time interval indicates the time spacing between two time instants at which it is to be expected that various regions of that region of the tool to be tested enter the measuring beam. The signals are then detected that indicate interactions of the measuring beam with obstacles in its propagation path, the detection being performed until at least two consecutive such signals are detected whose time spacing corresponds to the predetermined standard time interval.

In addition, it is possible to start the detection after a last signal detected in the standard time interval, the time spacing of the standard time instants corresponding to the standard time interval.

In order to test tools of irregular geometry, it is possible to define a sequence of standard time intervals as a function of a standard pitch of the tool that is in this case an irregular pitch. Subsequently, the signals that indicate the interactions of the measuring beam with obstacles in its propagation path are detected until at least two consecutive signals are detected whose time spacing corresponds to one of the standard time intervals of the defined sequence. Preferably, in the above-described embodiments of the invention, the detection used for synchronization is performed continuously.

It is consequently made possible to start the detection according to the invention after a last signal detected in one of the standard time intervals. According to the invention, the detection then takes place at the standard time instants whose time spacings in this case have a sequence that corresponds to the defined sequence of standard time intervals.

Furthermore, it is to be preferred that the tool to be tested is positioned in the measuring range by detecting an entry of the envelope surface of the region to be tested, which envelope surface results from the rotation of the tool, using the measuring beam.

It is also possible to generate a result signal in response to the detection according to the invention in order to indicate a total result of the testing of the tool. It is thus possible to generate a result signal that indicates a successful summary testing of the tool if a number of the signals detected at the standard time instants is above a predetermined number or the predetermined number is reached exactly.

In a further embodiment of the invention, the determination of the standard time instants is performed again if the number of the signals detected at the standard time instants is below the predetermined number. In addition, a result signal can be generated that indicates an unsuccessful testing of the tool if the number of the signals detected at the standard time instants is below the predetermined number.

In addition, it is possible to define a detection time period for which the detection is performed at the standard time instants.

In addition, a determination time period may be chosen that indicates the space of time in which the determination of the standard time instants is performed. Thus, a result signal can be generated that indicates an unsuccessful summary testing of the tool if the determination of the standard time instants is performed for longer than the chosen determination time period.

The detection time period and/or the determination time period may be determined in this connection as a function of the rotation of the tool and/or as a function of the standard pitch.

In order to test not only an individual region of the tool, but to test a plurality of regions of the tool or the entire tool, the method according to the invention is repeated after completion of the test. In this case, after completion of the testing of a region of the tool, movement is performed relative to the measuring range in such a way that the envelope surface, produced by the rotation, of a further region to be tested enters the measuring range or is situated in the latter. The subsequent test steps according to the invention are then performed again. This procedure is repeated for every region to be tested, every further region of the tool to be tested preferably being adjacent to the previously tested region.

As an alternative to this testing of a plurality of regions or in combination therewith, a plurality of adjacent regions, fairly large continuous regions of the tool or the entire tool can be tested if, in addition to the rotation of the tool, the latter is simultaneously moved relative to the measuring range, for example perpendicularly to the measuring range so that an envelope surface, produced by the rotation and the relative movement of the tool, for the adjacent regions to be tested or of the continuous region to be tested enters the measuring range or is situated in the latter.

To execute the method according to the invention, a measuring system is used that has a transmitter for emitting a measuring beam, a receiver for receiving the measuring beam and for outputting signals that indicate a received measuring beam, an evaluation unit connected to the receiver for receiving signals outputted by the receiver and for generating signals that indicate the interactions of the measuring beam with obstacles in its propagation path as a function of the received signals and a control unit for controlling the measuring system.

In an embodiment of the invention, the evaluation unit evaluates the signals of the receiver only during chosen evaluation time intervals in which standard time instants are situated at which a region, corresponding to the region to be tested, of a reference tool having a standard pitch enters the measurement beam.

In another embodiment, the receiver receives the measuring beam only during chosen receiving time intervals in which in each case only one standard time instant is situated at which a region, corresponding to the region to be tested, of a reference tool having a standard pitch enters the measuring beam.

In a further embodiment, the transmitter transmits the measuring beam only during chosen transmitting time intervals in which a standard time instant is situated in each case at which a region, corresponding to the region to be tested, of a reference tool having a standard pitch enters the measuring beam.

Further embodiments of the invention emerge as combinations of individual or a plurality of the abovementioned embodiments of the measuring system according to the invention.

In order to achieve a compact design, the control unit and/or the evaluation unit may be incorporated in the transmitter and/or the receiver.

In order to be able to use the measuring system according to the invention flexibly, the evaluation unit and/or the control unit should be programmable.

In addition, it is desirable to connect the measuring system or, preferably, the control unit to a machine or its control, respectively, that rotates the tool to be tested in order, for example, to exchange items of information relating to the rotational speed, shape of the tool, desired machining operations and their precision and also tests of the tool performed with the measuring system according to the invention.

The measuring beam can be any desired beam that can enter into interaction with a tool to be tested and with other obstacles in its propagation path and which makes possible a detection of the interactions with a suitable receiver or detector. Thus, the measuring beam may be an optical measuring beam, an electromagnetic measuring beam, a corpuscular measuring beam or a combination of said measuring beams. In view of the available components that are necessary to generate, emit and detect measuring beams, and also their complexity and cost, the measuring beam is preferably an optical measuring beam and, in particular, a laser light beam.

Since in the method according to the invention, the testing of the tool takes place essentially at the so-called standard time instants at which it is to be expected that that region of the tool to be tested enters the measuring beam, spurious measurements are avoided that are to be attributed to interaction and that are not interactions of the measuring beam with the region to be tested.

Furthermore, the invention makes it possible, as a result of the use of programmable control and evaluation units, to adapt flexibly the testing of a tool of a machine tool in an application-specific way to the respective tool used and the respective machine tool used. Thus, tools can be tested that rotate at different rotational speeds and that have the most varied, and even irregular geometries and pitches.

Figure 2:
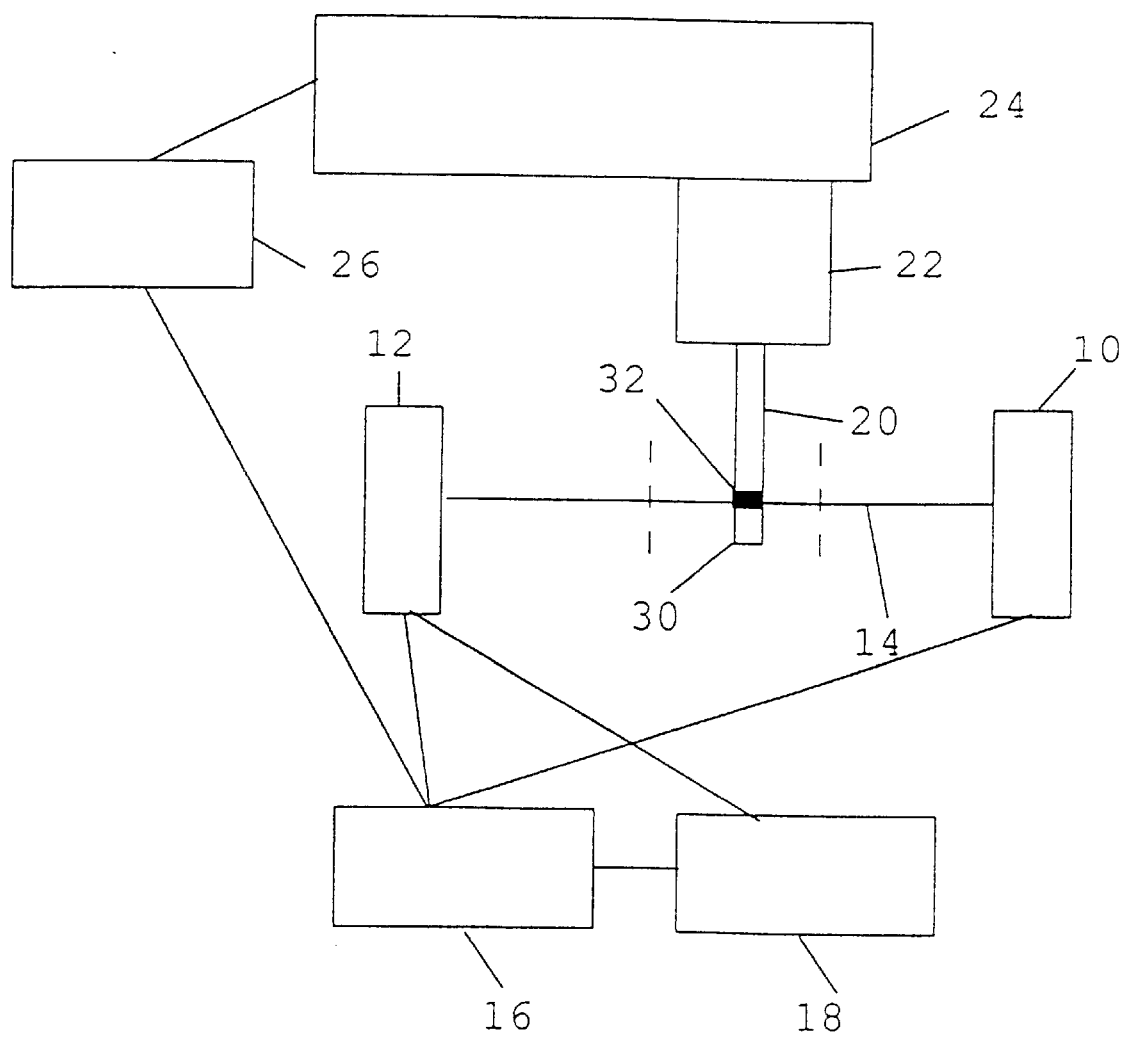
Figure 3:
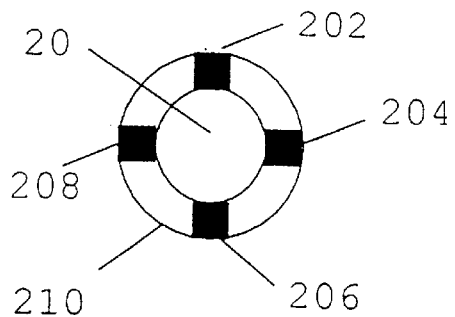
Figure 4:
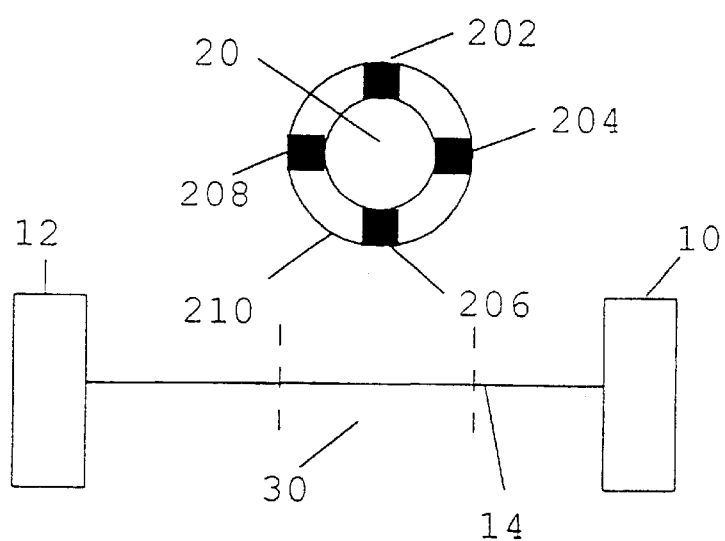
Figure 5:
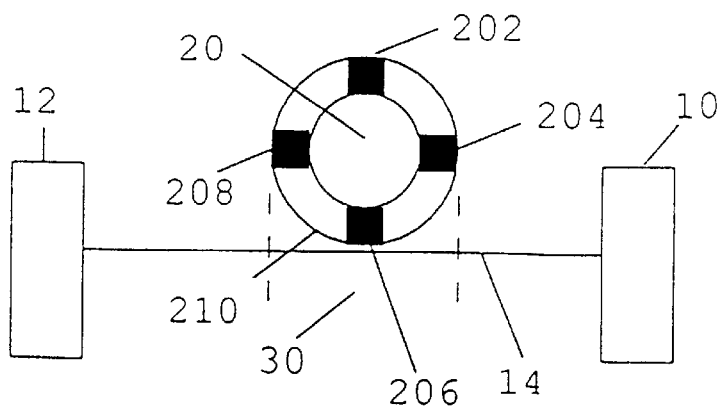
Figure 6:
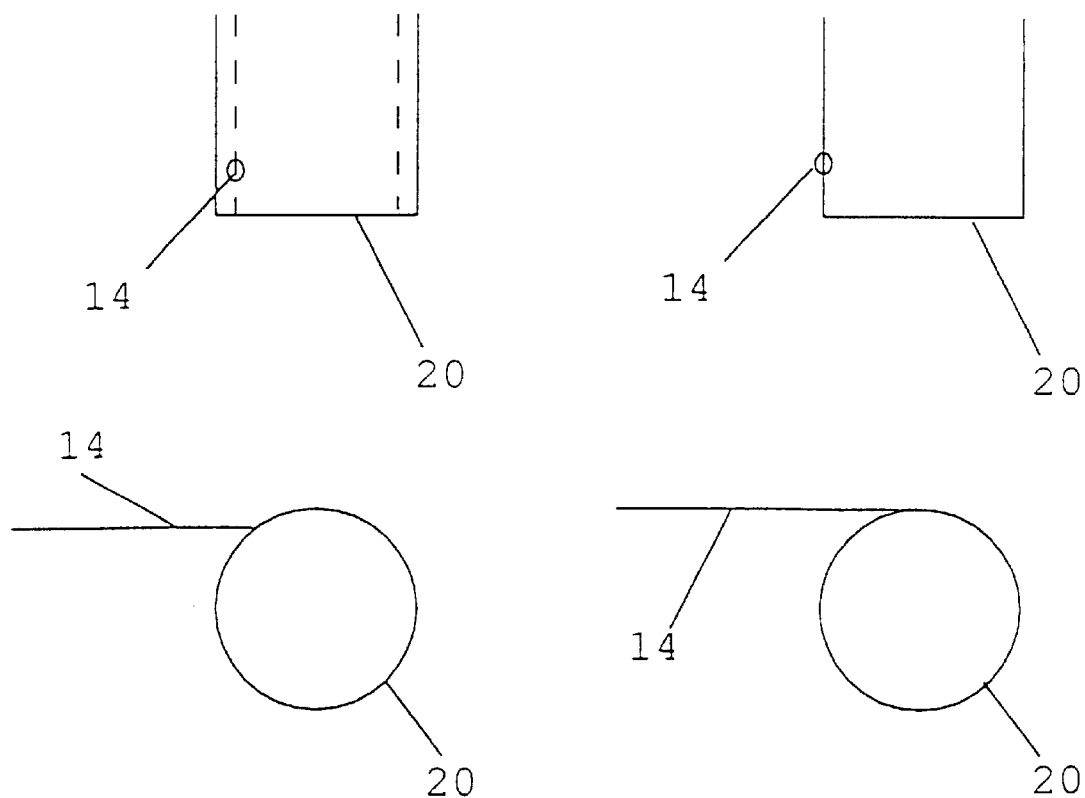

Exemplary embodiments of the invention are explained below by reference to diagrammatic drawings containing further details. In the drawings:

FIG. 1 shows an arrangement of the measuring system according to the invention and a tool to be tested in a spindle of a machine tool prior to the testing according to the invention, FIG. 2 shows the arrangement from FIG. 1 during the testing of the tool according to the invention, FIG. 3 shows a cross section of a tool to be tested transversely to its longitudinal axis, the cross section corresponding to that region of the tool to be tested, FIG. 4 shows a view of the measuring system according to the invention and that region of the tool to be tested from FIG. 3 prior to entering a measuring range, FIG. 5 shows a diagrammatic view of the measuring system according to the invention and that region of the tool to be tested from FIG. 3 during entry into the measuring range, FIG. 6 shows a diagrammatic representation of the position of the tool relative to the measuring beam as a function of the position of the test region on the tool, FIG. 7 shows a signal pattern of signals detected according to the invention and the associated positions of a tool having regular cross-sectional geometry in the measuring arrangement according to the invention, FIG. 8 shows a signal pattern of signals detected according to the invention and also the corresponding positions of a tool having irregular cross-sectional geometry in the measuring system according to the invention, FIG. 9 shows a signal pattern of signals detected according to the invention and the associated positions of a defective tool having regular cross-sectional geometry in the measuring arrangement according to the invention, and FIG. 10 shows a signal pattern of signals detected according to the invention and also the corresponding positions of a defective tool having irregular cross-sectional geometry in the measuring system according to the invention.

The simplified representation of an arrangement according to the invention in FIGS. 1 and 2 essentially comprises a measuring system 10, 12, 14, 16, 18 and a machine tool, of which only a tool 20 to be tested, a spindle 22 holding the tool 20, a spindle motor 24 driving the spindle 22 and a control 26 are shown. The measuring system comprises a transmitter 10, a receiver 12, which receives a measuring beam 14 emitted by the transmitter 10, and also a control unit 16 and an evaluation unit 18 that are connected to the transmitter 10 and the receiver 12.

The measuring beam 14 used here is a laser beam, but it is also possible to use any optical beam suitable for the measurement, electromagnetic measuring beams, corpuscular measuring beams or combinations of said measuring beams.

The range of the measuring beam 14 between the transmitter 10 and the receiver 12 corresponds to that range of the measuring system in which a tool is tested. The distance between the transmitter 10 and the receiver 12 is to be kept as small as possible as a function of the dimensions of the tools to be tested in order to avoid interferences during the measurement.

A test region 32 is defined on the tool 20 to be tested. The position and dimensions of the test region 32 depend on the particular tool geometry and on machining steps performed with said tool. To perform the method, it is necessary for the test region 32 to enter the measuring range 30. For this purpose, the tool 20 is moved out of a position in which the test region 32 is situated outside the measuring range 30, as shown in FIG. 1, into a position in which the test region 32 is situated in the measuring range 30, as is to be seen in FIG. 2. In FIGS. 1 and 2, the tool 20 and, consequently, the test region 32 are moved in a direction extending parallel to the longitudinal axis of the tool 20 with the result that the test region 32 enters measuring range 30. The type of movement of the tool to be tested has to be defined for every application case as a function of the machine tool that carries a tool to be tested, the arrangement of the measuring system in the machine tool, the type of tool to be tested and the position and dimensions of a defined test region. The type of movement of the tool 20 does not play a role in executing the test method and it is only necessary to ensure that the test region 32 enters the measuring range 30.

FIG. 3 shows a simplified representation of a cross-sectional view of the test region 32 of the tool 20. In this case, the tool 20 has four cutting edges 202, 204, 206, 208 that are to be tested. To perform the method, it is necessary for the tool 20 to be rotated with a desired, constant rotational speed before and/or while the test region 32 enters the measuring range 30 and the test region 32 is situated in the measuring range 30. The rotation of the tool 20 produces an envelope surface 210 that envelops the test region 32. The movement of the tool 20 out of a position in which the test region 32 is situated outside the measuring range 30, as is shown in FIG. 4, is terminated as soon as the envelope surface 210 enters the measuring region, as shown in FIG. 5.

Preferably, the measuring beam 14 is used to detect the entry of the envelope surface 210 into the measuring range 30. However, it is also possible, for example, to determine the entry of the envelope surface 210 into the measuring range 30 from the relative position of the tool 20 with respect to the measuring beam 14. If the measuring beam 14 is used to detect the entry of the envelope surface 210 into the measuring range 30, the measuring beam 14 becomes blocked as soon as one of the cutting edges 202, 204, 206, 208 enters the measuring range 30, with the result that the receiver 12 no longer receives the measuring beam 14. The receiver 12 detects the interruption of the measuring beam 14 and generates a signal that indicates said interruption.

Preferably, the receiver 12 emits a pulse-type signal in this case, but any known signal can be used that indicates an interruption of the measuring beam 14. Said signal is passed by the receiver 12 either directly to the control unit 16 of the measuring system or via the evaluation unit 18 to the latter.

The control unit 16 then emits a signal to the control 26 of the machine tool. In response to said signal, the control 26 terminates the travelling movement of the tool 20. If that region 32 of the tool 20 to be tested is situated on an external surface of the same, the travelling movement is terminated immediately after receipt of the signal emitted by the control unit 16. In contrast thereto, after receipt of the signal emitted by the control unit 16, the travelling movement is terminated only after a predetermined time period or a predetermined additional distance if the test region 32 of the tool 20 is not on an external surface of the same, but is situated "in" the tool. The resulting positions of the tool 20 relative to the measuring range 30 or the measuring beam 14 are sketched for these various cases in FIG. 6.

As a result of the rotation of the tool 20, the cutting edges 202, 204, 206, 208 enter the measuring range 30 consecutively and interrupt the measuring beam 14 in doing so. The time spacing of the interruptions of the measuring beam 14 by the cutting edges 202, 204, 206, 208 is in this case the same and constant since the tool 20 rotates at a constant rotational speed and the distance between the cutting edges 202, 204, 206, 208 is the same.

This type of interruption of the measuring beam 14 has the result that the receiver 12 emits signals, such as those shown by way of example in FIG. 7. FIG. 7 shows the signal pattern generated by the receiver 12 and also the corresponding positions of the tool 20 in the measuring range 30, more precisely the relative position of the cutting edges 202, 204, 206, 208 with respect to the measuring beam 14. Damage to or a complete absence of one of the cutting edges would have the result that the receiver 12 does not generate a signal at a time instant, a so-called standard time instant, at which it is to be expected that a cutting edge interrupts the measuring beam since the damaged or absent cutting edge does not cause an interruption of the measuring beam 14.

In contrast, the receiver 12 would also generate a signal if the interruption of the measuring beam 14 is not attributable to an interruption by one of the cutting edges, but has another reason. This is the case if, for example, coolant or chips enter the measuring range 30 and interrupt the measuring beam 14. The evaluation of such a signal may result in spurious measurements and, consequently, in a defective checking of the tool 20.

In order, on the one hand, to avoid this type of spurious measurement and in order, on the other hand, to check the cutting edges 202, 204, 206, 208, the signals generated by the receiver 12 and passed to the evaluation unit 18 are evaluated only during chosen detection time intervals that each comprise a standard time instant at which it is to be expected that one of the cutting edges 202, 204, 206, 208 interrupts the measuring beam 14. In this connection, detection time intervals are used that do not overlap in time and comprise the respective standard time instant with only a slight time excess.

If the evaluation unit 18 detects an absence of a signal during said detection time intervals, it can be concluded therefrom that one of the cutting edges 202, 204, 206, 208 is absent or damaged, i.e. has dimensions that do not comply with the required dimensions.

The procedure in the evaluation of the signals generated by the receiver 12 avoids the above-described spurious measurements since signals are not detected and evaluated that are not attributable to an interruption of the measuring beam 14 by one of the cutting edges 202, 204, 206, 208 since they are situated outside the detection time intervals and, consequently, cannot be caused by the tool.

The method is also suitable for testing irregularly shaped tools. If the tool 20 to be tested has, for example, irregularly spaced cutting edges 202, 204, 206, as is to be seen in FIG. 8, the receiver 12 generates signals whose time spacings are different. Such an irregular signal pattern, to be understood as by way of example, is shown in FIG. 8. In this case, too, signals of the receiver 12 are evaluated by the evaluation unit 18 only during the detection time intervals that each comprise a standard time instant at which it is to be expected that one of the cutting edges 202, 204, 206 interrupts the measuring beam 14.

To perform the test method, it is therefore necessary to perform the evaluation of the signals of the receiver 12 in synchronism with the rotation of the tool 20 and as a function of the tool geometry. For this purpose, the control unit 16 receives, for example, from the control 26 of the machine tool items of information that relate to the rotational speed and the shape (for example, pitch) of the tool actually used. As an alternative thereto, control unit 16 accesses data relating to the shape (for example, pitch) of the tool actually used that are programmed into the control unit 16 or are stored in a memory that is not shown. In this connection, the items of information that relate to the rotational speed of the tool can be transmitted to the control unit 16 by the control 26. In order to make possible as simple as possible a structure of the test device, it is also possible to rotate the tool 20 at a previously defined constant rotational speed during the test, data indicating said rotational speed being programmed into the control unit 16 or being stored in the memory, not shown, for access by the control unit 16. As a result, there is no need to transmit items of information in regard to the rotational speed of the tool and/or the shape (for example, pitch) of the tool actually used to the control unit 16.

From said items of information, the control unit 16 calculates the standard time instants at which the tool 20 interrupts the measuring beam 14 if it has the desired pitch, i.e. the standard pitch. The control unit 16 now controls the evaluation unit 18 in such a way that it only evaluates signals of the receiver 12 during the detection time intervals. In order to ensure that the evaluation intervals of the evaluation unit 18 comprise the time instants at which desired interruptions of the measuring beam 14 should occur as a result of the rotation of the tool 20, the measuring system has to be synchronized with the rotation of the tool 20. The synchronization chosen in this case is described below.

In the synchronization of the evaluation unit 18 with the rotating tool 20, all the signals generated by the receiver 12 are evaluated by the evaluation unit 18 as explained below in a step interposed prior to the actual measuring operation. All the signals received by the receiver 12 are evaluated by the evaluation unit 18 in regard to their time spacing from one another. On the basis of the items of information received, for example, by the control unit 16, the spacings between the time instants at which the receiver 12 should generate a signal on the basis of a desired interruption of the measuring beam 14 are known to the evaluation unit 18. These time spacings, denoted below as standard time intervals, may, as a function of the geometry of the tool 20 to be tested, be the same or comprise a sequence of different standard time intervals. The evaluation unit 18 now compares the time spacings of all the signals received by the receiver 12 with the standard time interval or the standard time intervals.

If two signals are detected whose time spacing corresponds to a standard time interval, it may be concluded therefrom that the interruption of the measuring beam 14 resulting in said pulses is attributable to the cutting edges 202, 204, 206, 208. In order to avoid errors in this connection, it is preferable to terminate the synchronization operation only if more than two consecutive signals have been detected whose respective time spacing corresponds to the standard time interval.

If, in the case of an irregular standard pitch, a sequence of different standard time intervals is used for comparison, the synchronization operation is preferably terminated if the time spacings of a plurality of consecutive signals have a sequence that corresponds to this desired sequence. The testing reliability can in this case be increased by terminating the synchronization operation only if at least three consecutive signals are detected whose sequence of time spacings with respect to one another corresponds to a part of the sequence of the standard time intervals.

After the last signal of the receiver 12 has been detected in a standard time interval in the case of the synchronization procedures described above, the actual test operation is started in a time spacing that ensures that the detection time intervals comprise all the standard time instants.

The magnitudes of the detection time intervals are to be dimensioned in such a way that, on the one hand, no signal of the receiver 12 is lost that is attributable to desired interruption of the measuring beam 14 and, on the other hand, signals are not evaluated that are attributable to undesirable interruptions of the measuring beam 14. Thus, in dimensioning the detection time intervals, the rotational speed of the tool 20 whose geometry (for example, pitch) and a desired quality of a machining operation to be performed with the tool 20 is, inter alia, to be undertaken. Ideally, the detection time intervals are to be chosen as so small that they contain the standard time instants with only a slight time excess. This requires, however, an exact and complex control of the measuring system in order not to obtain spurious measurements. The magnitudes of the detection time intervals are therefore to be chosen as a function of the particular application case.

The evaluation unit 18 performs the detection of pulses of the receiver 12 during the detection time intervals for a detection period to be defined. In order to ensure that all the cutting edges 202, 204, 206, 208 of the tool 20 are checked, the detection period should be chosen in such a way that each of the cutting edges 202, 204, 206, 208 enter the measuring range at least once. That is to say, the detection period should correspond at least to the period of a complete revolution of the tool 20. An increased reliability of the method according to the invention can be achieved if a longer detection period is chosen, i.e. the tool is checked for more than one revolution. In this connection, care should be taken that the actual operation of the machine tool is not substantially lengthened in the choice of test period.

If the evaluation unit 18 detects, during the detection period, a number of signals of the receiver 12 that are below a predetermined number, it may be concluded that one of the cutting edges 202, 204, 206, 208 is absent or damaged. Said predetermined number is to be defined as a function of the detection period, the geometry or pitch of the tool 20, a desired quality and reliability of the measuring method and other factors that affect the measuring operation. If a number of signals of the receiver 12 is detected that is greater than the predetermined number or is equally large, the evaluation unit 18 emits a signal that indicates that the entire testing of the tool was successful. If the number of signals detected is below the predetermined number, the evaluation unit 18 emits a signal that indicates a failed overall test.

In order to make the testing operation as short as possible, the detection period is to be chosen in such a way that it corresponds to the period of a complete revolution of the tool 20. In this case, it may be concluded that the tool 20 is undamaged or has the desired geometry if the number of detected signals corresponds to the number of cutting edges. That is to say, in the case shown in FIG. 7, the testing of the tool 20 is successful if four signals are detected, whereas, in the case shown in FIG. 8, the testing of the tool 20 is successful if three signals are detected.

If less than four signals are detected in the case shown in FIG. 7 or less than three signals in the case shown in FIG. 8, the particular tool test has failed, i.e. one of the cutting edges is absent or is damaged, as is shown for the cutting edge 204 in FIG. 9 and for the cutting edge 206 in FIG. 10. Consequently, at the time instants that correspond to the respective standard time instants for the absent or defective cutting edges, namely the cutting edges 204 and 206 from FIGS. 9 and 10, respectively, no signals are detected that indicate an interaction of the measuring beam 14 with the region 32 to be tested. The pattern of the signals detected here is likewise sketched in FIGS. 9 and 10, the signals to be expected at the standard time instants but not detected being shown as dotted lines.

In the description hitherto, the detection was performed during the detection time intervals by the evaluation unit 18 evaluating signals of the receiver 12 only during the detection time intervals comprising the standard time instants. Detection may, however, also be achieved by the transmitter 10 emitting the measuring beam 14 only during the detection time intervals comprising the standard time instants. This is likewise achieved if the receiver 12 detects the measuring beam 14 only during the detection time intervals comprising the standard time instants. The checking of a tool may be performed using any desired combination of these three, last-named embodiments.

In order to make possible a use of the invention that is as flexible and application-specific as possible, it is preferable that the control unit 16 and/or the evaluation unit 18 comprise programmable units. Using the programmable units, it becomes possible to adapt the measuring system according to the invention to the particular machine tool used, the various tools to be tested and a wide variety of test conditions without having to change the structural design of the measuring system in doing so. The programmable units may comprise, for example, microprocessors that are incorporated in the control unit 16 and/or the evaluation unit 18, be made available in the form of a computer system that is connected to the control unit 16 and/or the evaluation unit 18, or be formed by any combination thereof.

We claim:

1. A method of testing a cutting-edge geometry of a rotatably drivable tool with a measuring system, comprising the following steps:
    definition of a region, to be tested, on the tool,
    rotation of the tool at a chosen constant rotational speed,
    emission of a measuring beam that defines the measuring range,
    positioning of the tool so that an envelope surface, produced by the rotation, of its region to be tested enters the measuring range, and
    detection of signals that indicate interactions of the measuring beam with obstacles in its propagation path,
    synchronization of the measuring system with the rotation of the tool on the basis of the sequence of detected signals, and
    subsequently performing the detection only during chosen detection time intervals that each comprise a standard time instant, each standard time instant being a time instant at which it is to be expected that the region to be tested enters the measuring range during rotation.

2. The method according to claim 1, characterized in that the detection time intervals are chosen in such a way that they do not overlap in time.

3. The method according to claim 2, characterized in that the reference tool is a real tool whose dimensions comply with the desired dimensions for the tool to be tested.

4. The method according to claim 2, characterized in that the reference tool is a virtual tool being indicated by a formal description of the dimensions of the tool to be tested.

5. The method according to claim 1, characterized in that the detection time intervals are chosen in such a way that they each comprise the corresponding standard time instant symmetrically.

6. The method according to claim 1, characterized in that the detection time intervals are chosen in such a way that they start shortly before the corresponding standard time instant and end shortly after the corresponding time interval.

7. The method according to claim 6, characterized in that the formal description is indicated by at least one of a mathematical formula and data.

8. The method according to claim 1, characterized in that at least one of the standard time instants and the detection time intervals is determined as a function of the rotational speed of the tool.

9. The method according to claim 1, characterized in that at least one of the standard time instants and the detection time intervals is determined as a function of a standard pitch of the tool.

10. The method according to claim 1, characterized in that the determination of the standard time instants comprises the following steps:
    determination of a standard time interval as a function of a standard pitch of the tool and of the chosen rotational speed, and
    detection of the signals that indicate interactions of the measuring beam with obstacles in its propagation path, the detection being performed until at least two consecutive signals are detected whose time spacing corresponds to the standard time interval.

11. The method according to claim 10, characterized in that
    the time spacing of the standard time instants corresponds to the standard time interval, and
    the detection is started during the detection time intervals after a last signal detected in the standard time interval.

12. The method according to claim 1, characterized in that the determination of the standard time instants comprises the following steps:
    definition of a sequence of standard time intervals as a function of a standard pitch of the tool that comprises at least two defined standard time intervals, and
    detection of the signals that indicate interactions of the measuring beam with obstacles in its propagation path, the detection being performed until at least two consecutive signals are detected whose time spacing corresponds to one of the standard time intervals.

13. The method according to claim 10 or 12, characterized in that the detection of signals is performed continuously for the purpose of synchronizing the measuring system.

14. The method according to claim 12, characterized in that
    a sequence of time spacings of the standard time instants corresponds to the defined sequence of standard time intervals, and
    the detection is started during the detection time intervals after the last of the signals detected in one of the standard time intervals.

15. The method according to claim 1, characterized in that the entry of the envelope surface of the region to be tested into the measuring range is detected using the measuring beam.

16. The method according to claim 1, characterized in that a result signal that indicates a summary result of the testing of the cutting-edge geometry is generated in response to the detected signals.

17. The method according to claim 1, characterized in that a result signal is generated that indicates a successful summary testing of the cutting-edge geometry if a number of signals detected during the detection time intervals is above a predetermined number or corresponds to the predetermined number.

18. The method according to claim 17, characterized in that the determination of the standard time instants and the detection is performed again if the number of the signals detected during the detection time intervals is below the predetermined number.

19. The method according to claim 1, characterized in that a result signal is generated that indicates an unsuccessful summary testing of the cutting-edge geometry if the number of the signals detected during the detection time intervals is below a predetermined number.

20. The method according to claim 1, characterized in that the detection is performed during the detection time intervals for a chosen detection time period.

21. The method according to claim 1, characterized by at least one of the following steps
the determination of the standard time instants is performed for a chosen determination time period, and
a result signal is generated that indicates an unsuccessful testing of the tool if the determination of the standard time instants is performed for longer than a chosen determination time period.

22. The method according to claim 20 or 21, characterized in that the detection time period and the determination time period is determined as at least one of a function of the rotational speed of the tool and as a function of a standard pitch.

23. The method according to claim 1, characterized in that, after completion of the test, the method is repeated in order to test a further region on the tool, the tool being moved relative to the measuring range in such a way that an envelope surface, produced by the rotation, of the further region to be tested enters the measuring region.

24. The method according to claim 1, characterized in that, in addition to the rotation of the tool, the latter is simultaneously moved relative to the measuring range so that an envelope surface, produced by the rotation and the relative movement of the tool, of the region to be tested enters the measuring range (30).

25. The method according to claim 1, characterized in that the standard time instants are determined by using a specified pitch of a reference tool corresponding to the tool to be tested.

26. A measuring system for testing a cutting-edge geometry of a tool that is adapted to be rotatably driven at a chosen rotational speed, comprising:
a transmitter for emitting a measuring beam,
a receiver for receiving the measuring beam and for outputting signals that indicate a received measuring beam,
an evaluation unit connected to the receiver for receiving signals outputted by the receiver and for generating signals that indicate interactions of the measuring beam with obstacles in its propagation path as a function of the received signals, and
a control unit for controlling the measuring system, wherein
the evaluation unit evaluates the signals of the receiver only during chosen evaluation time intervals that each comprise a standard time instant, each standard time instant being a time instant at which it is to be expected that the region to be tested enters the measuring range during rotation.

27. The method according to claim 26, characterized in that the standard time instants are determined by using a specified pitch of a reference tool corresponding to the tool to be tested.

28. The method according to claim 27, characterized in that the reference tool is a real tool whose dimensions comply with the desired dimensions for the tool to be tested.

29. The method according to claim 27, characterized in that the reference tool is a virtual tool being indicated by a formal description of the dimensions of the tool to be tested.

30. The method according to claim 29, characterized in that the formal description is indicated by at least one of a mathematical formula and data.

31. A measuring system for testing a cutting-edge geometry of a tool that is adapted to be rotatably driven at a chosen rotational speed, comprising:
a transmitter for emitting a measuring beam,
a receiver for receiving the measuring beam and for outputting signals that indicate a received measuring beam,
an evaluation unit connected to the receiver for receiving signals outputted by the receiver and for generating signals that indicate interactions of the measuring beam with obstacles in its propagation path as a function of the received signals and
a control unit for controlling the measuring system, wherein
the receiver receives the measuring beam only during chosen receiving time intervals that each comprise a standard time instant, each standard time instant being a time instant at which it is to be expected that the region to be tested enters the measuring range during rotation.

32. The method according to claim 31, characterized in that the standard time instants are determined by using a specified pitch of a reference tool corresponding to the tool to be tested.

33. The method according to claim 32, characterized in that the reference tool is a real tool whose dimensions comply with the desired dimensions for the tool to be tested.

34. The method according to claim 32, characterized in that the reference tool is a virtual tool being indicated by a formal description of the dimensions of the tool to be tested.

35. The method according to claim 34, characterized in that the formal description is indicated by at least one of a mathematical formula and data.

36. A measuring system for testing a cutting-edge geometry of a tool that is adapted to be rotatably driven at a chosen rotational speed, comprising
a transmitter for emitting a measuring beam,
a receiver for receiving the measuring beam and for outputting signals that indicate a received measuring beam,
an evaluation unit connected to the receiver for receiving the signals outputted by the receiver and for generating signals that indicate interactions of the measuring beam with obstacles in its propagation path as a function of the received signals and
a control unit for controlling the measuring system, wherein
the transmitter emits the optical measuring beam only during chosen transmission time intervals that each comprise a standard time instant, each standard time instant being a time instant at which it is to be expected that the region to be tested enters the measuring range during rotation.

37. The method according to claim 36, characterized in that the standard time instants are determined by using a specified pitch of a reference tool corresponding to the tool to be tested.

38. The method according to claim 37, characterized in that the reference tool is a real tool whose dimensions comply with the desired dimensions for the tool to be tested.

39. The method according to claim 37, characterized in that the reference tool is a virtual tool being indicated by a formal description of the dimensions of the tool to be tested.

40. The method according to claim 39, characterized in that formal description is indicated by at least one of the mathematical formula and data.

41. The measuring system according to claim 26, 31 or 36, characterized in that at least one of the evaluation unit and the control unit is at least partly incorporated in at least one of the transmitter and in the receiver.

42. The measuring system according to claim 26, 31, or 36, characterized in that the control unit and the evaluation unit is programmable.

43. The measuring system according to claim 26, 31, or 36, characterized in that the control unit and/or the evaluation unit are connected to a control of the machine rotating the tool.

44. The measuring system according to claims 26, 31 or 36, characterized in that the measuring beam is an optical measuring beam.

45. The measuring system according to claims, 26, 31, 28, characterized in that the measuring beam is a laser light beam.

\* \* \* \* \*